(12) United States Patent
Zhao et al.

(10) Patent No.: US 11,488,308 B2
(45) Date of Patent: Nov. 1, 2022

(54) THREE-DIMENSIONAL OBJECT DETECTION METHOD AND SYSTEM BASED ON WEIGHTED CHANNEL FEATURES OF A POINT CLOUD

(71) Applicant: INSTITUTE OF AUTOMATION, CHINESE ACADEMY OF SCIENCES, Beijing (CN)

(72) Inventors: Xin Zhao, Beijing (CN); Kaiqi Huang, Beijing (CN); Zhe Liu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 264 days.

(21) Appl. No.: 16/968,573

(22) PCT Filed: Apr. 19, 2019

(86) PCT No.: PCT/CN2019/083372
§ 371 (c)(1),
(2) Date: Aug. 8, 2020

(87) PCT Pub. No.: WO2020/151109
PCT Pub. Date: Jul. 30, 2020

(65) Prior Publication Data
US 2021/0042929 A1   Feb. 11, 2021

(30) Foreign Application Priority Data
Jan. 22, 2019 (CN) .......................... 201910059002.0

(51) Int. Cl.
*G06T 7/10* (2017.01)
*G06T 7/00* (2017.01)
(Continued)

(52) U.S. Cl.
CPC ................ *G06T 7/10* (2017.01); *G06N 3/08* (2013.01); *G06T 7/97* (2017.01); *G06T 15/005* (2013.01);
(Continued)

(58) Field of Classification Search
CPC ........... G06T 7/10; G06T 7/97; G06T 15/005; G06T 2207/10028; G06T 2210/12;
(Continued)

(56) References Cited

U.S. PATENT DOCUMENTS

| | | | |
|---|---|---|---|
| 10,026,017 B2 | 7/2018 | Luo | |
| 2019/0147245 A1* | 5/2019 | Qi ........................ | G06V 20/10 382/103 |
| 2019/0180149 A1* | 6/2019 | Knittel ..................... | G06N 3/04 |

FOREIGN PATENT DOCUMENTS

CN         108171217 A      6/2018

OTHER PUBLICATIONS

Charles R. Qi et al., Frustum PointNets for 3D Object Detection from RGB-D Data, Apr. 13, 2018, pp. 1-15.

* cited by examiner

*Primary Examiner* — Jianxun Yang
(74) *Attorney, Agent, or Firm* — Bayramoglu Law Offices LLC

(57) ABSTRACT

A three-dimensional object detection method includes: extracting a target in a two-dimensional image by a pre-trained deep convolutional neural network to obtain a plurality of target objects; determining a point cloud frustum in a corresponding three-dimensional point cloud space based on each target object; segmenting the point cloud in the frustum based on a point cloud segmentation network to obtain a point cloud of interest; and estimating parameters of a 3D box in the point cloud of interest based on a network with the weighted channel features to obtain the parameters (Continued)

of the 3D box for three-dimensional object detection. According to the present invention, the features of the image can be learned more accurately by the deep convolutional neural network and the parameters of the 3D box in the point cloud of interest are estimated based on the network with the weighted channel features.

16 Claims, 2 Drawing Sheets

(51) Int. Cl.
    *G06N 3/08*          (2006.01)
    *G06T 15/00*        (2011.01)

(52) U.S. Cl.
    CPC ................. *G06T 2207/10028* (2013.01);
                                     *G06T 2210/12* (2013.01)

(58) Field of Classification Search
    CPC ... G06T 2207/20084; G06T 7/11; G06N 3/08;
                G06N 3/0454; G06V 10/24; G06K 9/62
    See application file for complete search history.

THREE-DIMENSIONAL OBJECT DETECTION METHOD AND SYSTEM BASED ON WEIGHTED CHANNEL FEATURES OF A POINT CLOUD

CROSS REFERENCE TO THE RELATED APPLICATIONS

This application is the national phase entry of International Application No. PCT/CN2019/083372, filed on Apr. 19, 2019, which is based upon and claims priority to Chinese Patent Application No. 201910059002.0, filed on Jan. 22, 2019, the entire contents of which are incorporated herein by reference.

TECHNICAL FIELD

The present invention relates to the field of computer vision and image processing technologies, and more particularly, to a three-dimensional object detection method and system based on weighted channel features of a point cloud.

BACKGROUND

Point cloud-based three-dimensional object detection is an important task in self-driving. Objects are typically detected by inputting point cloud data and inputting the corresponding RGB image data and then outputting the parameters of the three-dimensional (3D) box.

Generally, the three-dimensional point cloud needs to be rasterized first. Then, features of the point cloud are extracted by a three-dimensional convolution operation in each raster. The three-dimensional convolution operation, however, is very computationally intensive in large scenes and thus is difficult to be applied to real scenes. The point cloud in real scenes is found to be very sparse through observation.

3D data output from the sensor in self-driving is generally stored in the form of point clouds. Three-dimensional point cloud segmentation is critical to three-dimensional object detection in a real scene. Thus, a good segmentation effect can improve the performance of the three-dimensional object detection.

The estimation of the 3D box is the last step of three-dimensional object detection and is also a crucial step. Since the segmentation effect cannot be completely accurate, interference points inevitably exist in these point clouds, which may affect the final 3D box negatively.

SUMMARY

In order to solve the above-mentioned problems of the prior art, that is, to reduce interference in the point cloud, the present invention provides a three-dimensional object detection method and system based on weighted channel features of a point cloud.

To solve the above-mentioned technical problems, the present invention adopts the following technical solutions.

A three-dimensional object detection method based on weighted channel features of a point cloud includes:

extracting a target in a two-dimensional image by a pre-trained deep convolutional neural network to obtain a plurality of target objects;

determining a point cloud frustum in a corresponding three-dimensional point cloud space based on each target object;

segmenting the point cloud in the frustum based on a point cloud segmentation network to obtain a point cloud of interest; and estimating parameters of a 3D box in the point cloud of interest based on a network with the weighted channel features to obtain the parameters of the 3D box for three-dimensional object detection.

Optionally, the plurality of target objects are obtained by the following formula:

$$x, y, w, h = \text{Net}(I)$$

wherein, I represents the two-dimensional image, and Net represents the deep convolutional neural network. The position of each target object is represented by coordinates (x, y) of a center point, a length h and a width w of a two-dimensional (2D) box.

Optionally, the step of determining the point cloud frustum in the corresponding three-dimensional point cloud space based on each target object specifically includes:

converting a point $x_{vel}$ on a coordinate system of a Lidar sensor into a point $x_{cam}$ on a coordinate system of a camera:

$$x_{cam} = T_{vel}^{cam} x_{vel};$$

wherein, $T_{vel}^{cam}$ represents a transformation matrix of the coordinate system;

projecting the point $x_{cam}$ on the coordinate system of the camera to a pixel point $x_{img}$ on the two-dimensional image:

$$x_{img} = P x_{cam};$$

wherein, P represents a projection matrix from the coordinate system of the camera to a coordinate system of the two-dimensional image; and determining all point clouds projected onto the target object according to each target object, wherein all point clouds projected onto the target object form the point cloud frustum.

Optionally, the step of segmenting the point cloud in the frustum based on the point cloud segmentation network to obtain the point cloud of interest specifically includes:

calculating the probability that the point cloud in the frustum belongs to a point cloud of interest based on the point cloud segmentation network:

$$p_i = f(x_i, \theta)$$

wherein, $x_i$ represents the $i^{th}$ point cloud in the frustum, $\theta$ represents a network training parameter, $p_i$ represents the probability that the $i^{th}$ point cloud $x_i$ belongs to the point cloud of interest, and f represents the point cloud segmentation network; and determining and obtaining the point cloud of interest according to the probability that each point cloud belongs to the point cloud of interest and a set probability threshold.

Optionally, the step of determining and obtaining the point cloud of interest according to the probability that each point cloud belongs to the point cloud of interest and the set probability threshold specifically includes:

determining that the point cloud is the point cloud of interest if the probability that the point cloud belongs to the point cloud of interest is greater than 0.5, otherwise determining that the point cloud is not the point cloud of interest:

$$Mask_i = \begin{cases} 1, & p_i > 0.5 \\ 0, & p_i \leq 0.5 \end{cases};$$

wherein, $Mask_i$ represents a mask of the $i^{th}$ point cloud and takes a value of 1 or 0.

Optionally, a segmentation loss is generated in the process of segmenting the point cloud in the frustum:
a cross-entropy loss function:

$$\text{Entropy\_Loss}(y, y^*) = \sum_{i=1}^{N} y_i \log y_i^* + (1 - y_i)\log(1 - y_i^*);$$

wherein, y, y* represent a real category and a predicted result, respectively; and
the segmentation loss:

$$L_{seg} = \text{Entropy\_Loss}(y, y^*).$$

Optionally, the parameters of the 3D box include a center, a size, an angle and a corner; and
the step of estimating the parameters of the 3D box in the point cloud of interest based on the network with the weighted channel features specifically includes:
calculating a center loss, a size classification loss, a residual size regression loss, an angle classification loss, a residual angle regression loss and a corner loss of the 3D box based on the network with the weighted channel features;
calculating a total loss function according to the segmentation loss, the center loss, the size classification loss, the residual size regression loss, the angle classification loss, the residual angle regression loss and the corner loss of the 3D box; and
estimating the parameters of the 3D box in the point cloud of interest according to the total loss function to obtain the parameters of the 3D box.

Optionally, the center loss, the size classification loss, the residual size regression loss, the angle classification loss, the residual angle regression loss and the corner loss of the 3D box are respectively calculated according to the following formulas:
a Hingle loss function:

$$\text{Hingle}_\delta(x) = \begin{cases} 0.5x^2, & |x| \le \delta \\ \delta(|x| - 0.5\delta), & \text{otherwise} \end{cases};$$

(1) the center loss:

$$L_{center} = \text{Hingle}_{\delta=2.0}(x);$$

(2) the size classification loss of the 3D box:

$$L_{size-cls} = \text{Entropy\_Loss}(y, y^*);$$

(3) the residual size regression loss of the 3D box:

$$L_{size-reg} = \text{Hingle}_{\delta=1.0}(x);$$

(4) the angle classification loss of the 3D box:

$$L_{angle-cls} = \text{Entropy\_Loss}(y, y^*)$$

(5) the residual angle regression loss of the 3D box:

$$L_{angle-reg} = \sum_{m}^{S}\sum_{n}^{H} \text{Mask}_{mn}[2 - 2\cos(\theta_{mn} - \theta_{mn}^*)];$$

wherein, S represents the number of size templates of the 3D box, m=1, 2, ... S, H represents the number of direction angle templates of the 3D box, and n=1,2, ..., H; $\text{Mask}_{mn}$ represents a mask of an $m^{th}$ size template of the size templates of the 3D box and a mask of an $n^{th}$ direction angle template of the direction angle templates of the 3D box;

$\theta_{mn}$ represents a training parameter of a network in the $m^{th}$ size template of the 3D box and the $n^{th}$ direction angle template of the 3D box; and $\theta_{mn}^*$ represents a predicted parameter of the network in the $m^{th}$ size template of the 3D box and the $n^{th}$ direction angle template of the 3D box; and
(6) the corner loss of eight corners of the 3D box:

$$L_{corner} = \sum_{i=1}^{S}\sum_{j=1}^{H} \delta_{ij} \min\left\{\sum_{k=1}^{8}\|P_k^{ij} - P_k^+\|, \sum_{k=1}^{8}\|P_k^{ij} - P_k^-\|\right\};$$

wherein, $P_k^{ij}$ represents a real coordinate of the $j^{th}$ direction angle template of the $i^{th}$ size template in the $k^{th}$ corner, $P_k^+$ represents a predicted coordinate of the $k^{th}$ corner, and $P_k^-$ represents a coordinate of the corner after the 3D box is rotated by 180 degrees around a vertical direction; $\delta_{ij}$ represents a real label of the $j^{th}$ direction template of the $i^{th}$ size template.

Optionally, the total loss function L is calculated according to the following formula:

$$L = L_{seg} + \lambda(L_{center} + L_{size-reg} + L_{size-cls} + L_{angle-reg} + L_{angle-cls}) + \gamma L_{corner};$$

wherein, λ represents a weight of the center loss, angle loss and size loss of the 3D box, and γ represents a weight of the corner loss.

To solve the above-mentioned technical problems, the present invention further provides the following technical solution.

A three-dimensional object detection system based on weighted channel features of a point cloud includes:
an extraction unit, configured to extract a target in a two-dimensional image by a pre-trained deep convolutional neural network to obtain a plurality of target objects;
a determination unit, configured to determine a point cloud frustum in a corresponding three-dimensional point cloud space based on each target object;
a segmentation unit, configured to segment the point cloud in the frustum based on a point cloud segmentation network to obtain a point cloud of interest; and
an estimation unit, configured to estimate parameters of a 3D box in the point cloud of interest based on a network with the weighted channel features to obtain the parameters of the 3D box for three-dimensional object detection.

According to the embodiments of the present invention, the present invention has the following technical effects.

According to the present invention, the target in the two-dimensional image is extracted by the pre-trained deep convolutional neural network so that the features of the image can be learned more accurately. The point cloud in the frustum is segmented based on the point cloud segmentation network and the parameters of the 3D box in the point cloud of interest are estimated based on the network with the weighted channel features. This is done to reduce the weight of features of unimportant points and increase the weight of key points, which suppresses interference points and enhances key points. The precision of the parameters of the 3D box is significantly improved as a result.

Figure 1:
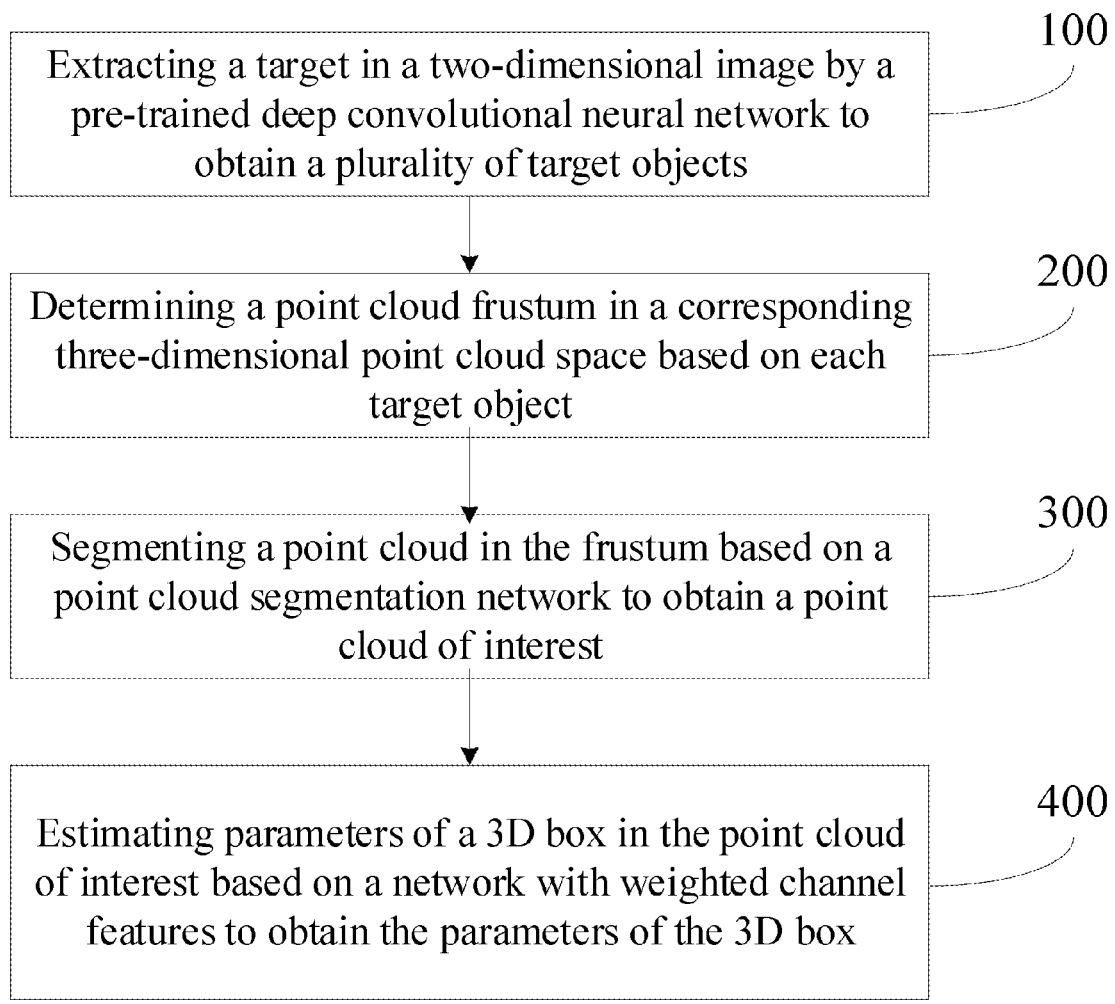
FIG. 1 is a flow chart of the three-dimensional object detection method based on the weighted channel features of the point cloud according to the present invention.

REFERENCE NUMERALS extraction unit-1, determination unit-2, segmentation unit-, and estimation unit-4.

DETAILED DESCRIPTION OF THE EMBODIMENTS

The preferred embodiments of the present invention are described hereinafter with reference to the drawings. It should be understood by those skilled in the art that these embodiments are only intended to illustrate the technical principles of the present invention rather than to limit the scope of protection of the present invention.

The objective of the present invention is to provide a three-dimensional object detection method based on weighted channel features of a point cloud. A target in a two-dimensional image is extracted by a pre-trained deep convolutional neural network so that features of the image can be learned more accurately. The point cloud in a frustum is segmented based on a point cloud segmentation network and parameters of the 3D box in the point cloud of interest are estimated based on a network with the weighted channel features to reduce the weight of features of unimportant points and increase the weight of key points. This has a result of suppressing the interference points and enhancing the key points, thereby improving the precision of the parameters of the 3D box.

In order to make the above-mentioned objectives, features and advantages of the present invention clearer, the present invention will be further described in detail hereinafter with reference to the drawings and specific embodiments.

As shown in FIG. 1, a three-dimensional object detection method based on weighted channel features of a point cloud according to the present invention includes:

Step 100: A target in a two-dimensional image is extracted by a pre-trained deep convolutional neural network to obtain a plurality of target objects.

Step 200: A point cloud frustum in a corresponding three-dimensional point cloud space is determined based on each target object.

Step 300: The point cloud in the frustum is segmented based on a point cloud segmentation network to obtain a point cloud of interest.

Step 400: Parameters of a 3D box in the point cloud of interest are estimated based on a network with the weighted channel features to obtain the parameters of the 3D box for three-dimensional object detection.

In step 100, the plurality of target objects are calculated and obtained according to the following formula:

$$x, y, w, h = \text{Net}(I);$$

wherein, I represents the two-dimensional image, and Net represents the deep convolutional neural network. The position of each target object is represented by coordinates (x, y) of a center point, a length h and a width w of a 2D box.

In step 200, the step of determining the point cloud frustum in the corresponding three-dimensional point cloud space based on each target object specifically includes:

Step 201: A point $x_{vel}$ on a coordinate system of a Lidar sensor is converted into a point $x_{cam}$ on a coordinate system of a camera:

$$x_{cam} = T_{vel}^{cam} x_{vel};$$

wherein, $T_{vel}^{cam}$ represents a transformation matrix of the coordinate system.

Step 202: The point $x_{cam}$ on the coordinate system of the camera is projected to a pixel point $x_{img}$ on the two-dimensional image:

$$x_{img} = P x_{cam};$$

wherein, P represents a projection matrix from the coordinate system of the camera to a coordinate system of the two-dimensional image.

Step 203: All point clouds projected onto the target object are determined according to each target object, wherein all point clouds projected onto the target object form the point cloud frustum.

For example, the relationship between the point cloud in the Lidar sensor and the target object in the two-dimensional image is established by steps 201-203, so that all point clouds projected onto the target object can be determined, namely, the desired point cloud frustum is obtained.

In step 300, the step of segmenting the point cloud in the frustum based on the point cloud segmentation network to obtain the point cloud of interest specifically includes:

Step 301: The probability that the point cloud in the frustum belongs to the point cloud of interest is calculated based on the point cloud segmentation network:

$$p_i = f(x_i, \theta)$$

wherein, $x_i$ represents the $i^{th}$ point cloud in the frustum, $\theta$ represents a network training parameter, $p_i$ represents the probability that the $i^{th}$ point cloud $x_i$ belongs to the point cloud of interest, and f represents the point cloud segmentation network; and The segmentation network adopts a convolution-deconvolution (Conv-Deconv) symmetric network structure to accurately learn the features of the image.

Step 302: The point cloud of interest is determined and obtained according to the probability that each point cloud belongs to the point cloud of interest and a set probability threshold.

Specifically, if the probability that the point cloud belongs to the point cloud of interest is greater than 0.5, it is determined that the point cloud is the point cloud of interest, otherwise the point cloud is not the point cloud of interest:

$$Mask_i = \begin{cases} 1, & p_i > 0.5 \\ 0, & p_i \leq 0.5 \end{cases};$$

wherein, $Mask_i$ represents a mask of the $i^{th}$ point cloud and takes a value of 1 or 0.

In addition, a segmentation loss is generated in the process of segmenting the point cloud in the frustum:

The cross-entropy loss function:

$$\text{Entropy\_Loss}(y, y^*) = \sum_{i=1}^{N} y_i \log y_i^* + (1 - y_i)\log(1 - y_i^*);$$

wherein, y, y* represent a real category and a predicted result, respectively.

The segmentation loss:

$$L_{seg} \text{Entropy\_Loss}(y, y^*)$$

In step 400, the parameters of the 3D box include a center, a size, an angle and a corner.

The step of estimating the parameters of the 3D box in the point cloud of interest based on the network with the weighted channel features specifically includes:

Step 401: A center loss, a size classification loss, a residual size regression loss, an angle classification loss, a residual angle regression loss and a corner loss of the 3D box are calculated based on the network with the weighted channel features.

The Hingle loss function:

$$Hingle_\delta(x) = \begin{cases} 0.5x^2, & |x| \le \delta \\ \delta(|x|-0.5\delta), & \text{otherwise} \end{cases}.$$

(1) The center loss:

$L_{center} = \text{Hingle}_{\delta=2.0}(x).$ (2) The size classification loss of the 3D box:

$L_{size\text{-}cls} = \text{Entropy\_Loss}(y, y^*).$ (3) The residual size regression loss of the 3D box:

$L_{size\text{-}reg} = \text{Hingle}_{\delta=1.0}(x)$ (4) The angle classification loss of the 3D box:

$L_{angle\text{-}cls} = \text{Entropy\_Loss}(y, y^*)$ (5) The residual angle regression loss of the 3D box:

$$L_{angle\text{-}reg} = \sum_{m}^{S}\sum_{n}^{H} Mask_{mn}[2 - 2\cos(\theta_{mn} - \theta_{mn}^*)];$$

wherein, S represents the number of size templates of the 3D box, m=1, 2, ... S, H represents the number of direction angle templates of the 3D box, and n=1, 2, ..., H; $Mask_{mn}$ represents a mask of an $m^{th}$ size template of the size templates of the 3D box and a mask of an $n^{th}$ direction angle template of the direction angle templates of the 3D box; $\theta_{mn}$ represents a training parameter of a network in the $m^{th}$ size template of the 3D box and the $n^{th}$ direction angle template of the 3D box; and $\theta^*_{mn}$ represents a predicted parameter of the network in the $m^{th}$ size template of the 3D box and the $n^{th}$ direction angle template of the 3D box.

(6) The corner loss of eight corners of the 3D box:

$$L_{corner} = \sum_{i=1}^{S}\sum_{j=1}^{H} \delta_{ij} \min\left\{\sum_{k=1}^{8}\|P_k^{ij} - P_k^+\|, \sum_{k=1}^{8}\|P_k^{ij} - P_k^-\|\right\};$$

wherein, $P_k^{ij}$ represents a real coordinate of the $j^{th}$ direction angle template of the $i^{th}$ size template in the $k^{th}$ corner, $P_k^+$ represents a predicted coordinate of the $k^{th}$ corner, and $P_k^-$ represents a coordinate of the corner after the 3D box is rotated by 180 degrees around a vertical direction; $\delta_{ij}$ represents a real label of the $j^{th}$ direction template of the $i^{th}$ size template.

Step 402: A total loss function is calculated according to the segmentation loss, the center loss, the size classification loss, the residual size regression loss, the angle classification loss, the residual angle regression loss and the corner loss of the 3D box.

The total loss function L is calculated according to the following formula:

$L = L_{seg} + \lambda(L_{center} + L_{size\text{-}reg} + L_{size\text{-}cls} + L_{angle\text{-}reg} + L_{angle\text{-}cls}) + \gamma L_{corner};$ wherein, λ represents a weight of the center loss, angle loss and size loss of the 3D box, and γ represents a weight of the corner loss.

Compared with the prior art, the present invention has the following significant advantages: 1) Since the method of the present invention uses Lidar and Image, which have a complementary effect, the method obtains significantly improved detection effect when performing detection on small objects. 2) The algorithm can directly perform detection on all categories of objects without the need of training different models for different categories, thus making the method especially versatile. 3) The weights among different channel features are considered in the algorithm to suppress unimportant features and enhance key features, thus extracting the features of the point cloud more effectively.

The present invention further provides a three-dimensional object detection system based on weighted channel features of a point cloud, which can reduce interference in the point cloud.

Figure 2:
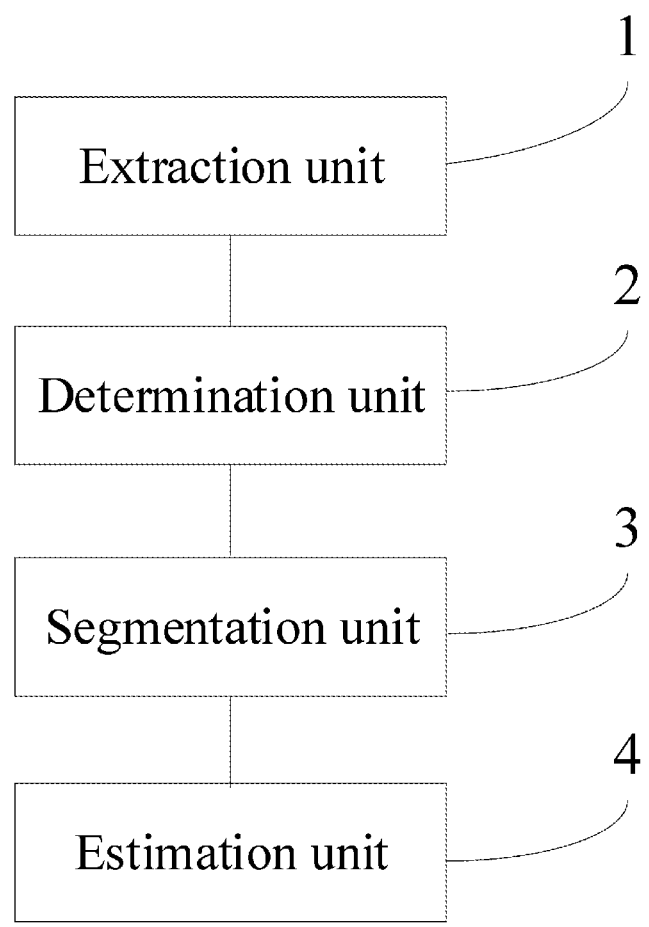
FIG. 2 is a structural schematic diagram of the modules of the three-dimensional object detection system based on the weighted channel features of the point cloud according to the present invention.

As shown in FIG. 2, the three-dimensional object detection system based on the weighted channel features of the point cloud according to the present invention includes the extraction unit 1, the determination unit 2, the segmentation unit 3 and the estimation unit 4.

The extraction unit 1 is configured to extract a target in a two-dimensional image by a pre-trained deep convolutional neural network to obtain a plurality of target objects.

The determination unit 2 is configured to determine a point cloud frustum in a corresponding three-dimensional point cloud space based on each target object.

The segmentation unit 3 is configured to segment the point cloud in the frustum based on a point cloud segmentation network to obtain a point cloud of interest.

The estimation unit 4 is configured to estimate parameters of a 3D box in the point cloud of interest based on a network with the weighted channel features to obtain the parameters of the 3D box for three-dimensional object detection.

Compared with the prior art, the three-dimensional object detection system based on the weighted channel features of the point cloud according to the present invention has the same advantages as those of the above-mentioned three-dimensional object detection method based on the weighted channel features of the point cloud, and thus is not repeatedly described herein.

Hereto, the technical solutions of the present invention have been described with reference to the preferred embodiments and the drawings. However, those skilled in the art can understand that the scope of protection of the present invention is obviously not limited to these embodiments. Those skilled in the art can make equivalent modifications or replacements to related technical features without departing from the principle of the present invention, and the technical solutions obtained by these modifications and replacements would fall within the scope of protection of the present invention.

What is claimed is:

1. A three-dimensional object detection method based on weighted channel features of a point cloud, comprising:
    extracting a target in a two-dimensional image by a pre-trained deep convolutional neural network to obtain a plurality of target objects;
    determining a point cloud frustum in a three-dimensional point cloud space corresponding to each target object of the plurality of target objects based on the each target object;

segmenting a point cloud in the point cloud frustum based on a point cloud segmentation network to obtain a point cloud of interest; and estimating parameters of a 3D box in the point cloud of interest based on a network with the weighted channel features to obtain the parameters of the 3D box for three-dimensional object detection;

wherein, the step of determining the point cloud frustum in the three-dimensional point cloud space corresponding to the each target object based on the each target object specifically comprises:

converting a point $x_{vel}$ on a coordinate system of a Lidar sensor into a point $x_{cam}$ on a coordinate system of a camera by the following formula:

$$x_{cam} = T_{vel}^{cam} x_{vel};$$

wherein, $T_{vel}^{cam}$ represents a transformation matrix from the coordinate system of the Lidar sensor to the coordinate system of the camera;

projecting the point $x_{cam}$ on the coordinate system of the camera to a pixel point $x_{img}$ on the two-dimensional image by the following formula:

$$x_{img} = P x_{cam};$$

wherein, P represents a projection matrix from the coordinate system of the camera to a coordinate system of the two-dimensional image; and determining a plurality of point clouds projected onto the each target object according to the each target object, wherein the plurality of point clouds projected onto the each target object form the point cloud frustum.

2. The three-dimensional object detection method according to claim 1, wherein, the plurality of target objects are obtained by the following formula:

$$x, y, w, h = \text{Net}(I);$$

wherein, I represents the two-dimensional image, and Net represents the pre-trained deep convolutional neural network; and coordinates (x, y) of a center point, a length h and a width w of a 2D box represent a position of the each target object.

3. The three-dimensional object detection method according to claim 1, wherein, the step of segmenting the point cloud in the point cloud frustum based on the point cloud segmentation network to obtain the point cloud of interest specifically comprises:

calculating a probability that the point cloud in the point cloud frustum belongs to a point cloud of interest based on the point cloud segmentation network by the following formula:

$$p_i = f(x_i, \theta);$$

wherein, $x_i$ represents an $i^{th}$ point cloud in the point cloud frustum, $\theta$ represents a network training parameter, $p_i$ represents a probability that the $i^{th}$ point cloud $x_i$ belongs to the point cloud of interest, and f represents the point cloud segmentation network; and determining and obtaining the point cloud of interest according to the probability that each point cloud in the point cloud frustum belongs to the point cloud of interest and a predetermined probability threshold.

4. The three-dimensional object detection method according to claim 3, wherein, the step of determining and obtaining the point cloud of interest according to the probability that the each point cloud in the point cloud frustum belongs to the point cloud of interest and the predetermined probability threshold, specifically comprises:

determining that the point cloud is the point cloud of interest if the probability that the point cloud belongs to the point cloud of interest is greater than 0.5; determining that the point cloud is not the point cloud of interest if the probability that the point cloud belongs to the point cloud of interest is less than or equal to 0.5:

$$Mask_i = \begin{cases} 1, & p_i > 0.5 \\ 0, & p_i \leq 0.5 \end{cases};$$

wherein, $Mask_i$ represents a mask of the $i^{th}$ point cloud and takes a value of 1 or 0, and $p_i$ represents the probability that the $i^{th}$ point cloud $x_i$ belongs to the point cloud of interest point cloud of interest.

5. A three-dimensional object detection method based on weighted channel features of a point cloud, comprising:

extracting a target in a two-dimensional image by a pre-trained deep convolutional neural network to obtain a plurality of target objects;

determining a point cloud frustum in a three-dimensional point cloud space corresponding to each target object of the plurality of target objects based on the each target object segmenting a point cloud in the point cloud frustum based on a point cloud segmentation network to obtain a point cloud of interest and estimating parameters of a 3D box in the point cloud of interest based on a network with the weighted channel features to obtain the parameters of the 3D box for three-dimensional object detection;

wherein, the step of segmenting the point cloud in the point cloud frustum based on the point cloud segmentation network to obtain the point cloud of interest specifically comprises:

calculating a probability that the point cloud in the point cloud frustum belongs to a point cloud of interest based on the point cloud segmentation network by the following formula:

$$p_i = f(x_i, \theta);$$

wherein, $x_i$ represents an $i^{th}$ point cloud in the point cloud frustum, $\theta$ represents a network training parameter, $p_i$ represents a probability that the $i^{th}$ point cloud $x_i$ belongs to the point cloud of interest, and f represents the point cloud segmentation network; and determining and obtaining the point cloud of interest according to the probability that each point cloud in the point cloud frustum belongs to the point cloud of interest and a predetermined probability threshold; and wherein, a segmentation loss is generated in the process of segmenting the point cloud in the point cloud frustum;

a cross-entropy loss function:

$$\text{Entropy\_Loss}(y, y^*) = \sum_{i=1}^{N} y_i \log y_i^* + (1 - y_i) \log(1 - y_i^*);$$

wherein, y, y* represent a real category and a predicted result, respectively; and N represents a total number of the point cloud in the point cloud frustum; and the segmentation loss:

$$L_{seg} = \text{Entropy\_Loss}(y, y^*).$$

6. The three-dimensional object detection method according to claim 5, wherein, the parameters of the 3D box comprise a center, a size, an angle and a corner;

the step of estimating the parameters of the 3D box in the point cloud of interest based on the network with the weighted channel features specifically comprises:

calculating a center loss, a size classification loss, a residual size regression loss, an angle classification loss, a residual angle regression loss and a corner loss of the 3D box based on the network with the weighted channel features;

calculating a total loss function according to the segmentation loss and the center loss, the size classification loss, the residual size regression loss, the angle classification loss, the residual angle regression loss and the corner loss of the 3D box; and estimating the parameters of the 3D box in the point cloud of interest according to the total loss function to obtain the parameters of the 3D box.

7. The three-dimensional object detection method according to claim 6, wherein, a Hingle loss function is calculated as follows:

$$Hingle_\delta(x) = \begin{cases} 0.5x^2, & |x| \le \delta \\ \delta(|x| - 0.5\delta), & |x| > \delta \end{cases};$$

(1) the center loss is calculated as follows:

$$L_{center} = Hingle_{\delta=2.0}(x);$$

(2) the size classification loss of the 3D box is calculated as follows:

$$L_{size-cls} = Entropy\_Loss(y, y^*);$$

(3) the residual size regression loss of the 3D box is calculated as follows:

$$L_{size-reg} = Hingle_{\delta=1.0}(x);$$

(4) the angle classification loss of the 3D box is calculated as follows:

$$L_{angle-cls} = Entropy\_Loss(y, y^*);$$

(5) the residual angle regression loss of the 3D box is calculated as follows:

$$L_{angle-reg} = \sum_m^S \sum_n^H Mask_{mn}[2 - 2\cos(\theta_{mn} - \theta^*_{mn})];$$

wherein, S represents a number of size templates of the 3D box; m =1, 2, . . . S; H represents a number of direction angle templates of the 3D box; n=1, 2, . . . , H; $Mask_{mn}$ represents a mask of an $m^{th}$ size template of the size templates of the 3D box and a mask of an $n^{th}$ direction angle template of the direction angle templates of the 3D box; $\theta_{mn}$ represents a training parameter of a network in the $m^{th}$ size template of the 3D box and the $n^{th}$ direction angle template of the 3D box; and $\theta^*_{mn}$ represents a predicted parameter of the network in the $m^{th}$ size template of the 3D box and the $n^{th}$ direction angle template of the 3D box;

(6) the corner loss of eight corners of the 3D box is calculated as follows:

$$L_{corner} = \sum_{i=1}^S \sum_{j=1}^H \delta_{ij} \min\left\{\sum_{k=1}^8 \|P_k^{ij} - P_k^+\|, \sum_{k=1}^8 \|P_k^{ij} - P_k^-\|\right\};$$

wherein, S represents the number of the size templates of the 3D box, H represents the number of the direction angle templates of the 3D box, $P_k^{ij}$ represents a real coordinate of a $j^{th}$ direction angle template of an $i^{th}$ size template in a $k^{th}$ corner, $P_k^+$ represents a predicted coordinate of the $k^{th}$ corner, and $P_k^-$ represents a coordinate of the $k^{th}$ corner after the 3D box is rotated by 180 degrees around a vertical direction; $\delta_{ij}$ represents a real label of the $j^{th}$ direction template of the $i^{th}$ size template.

8. The three-dimensional object detection method according to claim 7, wherein, the total loss function L is calculated according to the following formula:

$$L=L_{seg}+\lambda(L_{center}+L_{size-reg}+L_{size-cls}+L_{angle-reg}+L_{angle-cls})+\gamma L_{corner};$$

wherein, λ represents a weight of the center loss, the residual size regression loss, the size classification loss, the residual angle regression loss and the angle classification loss of the 3D box, and λ represents a weight of the corner loss.

9. A three-dimensional object detection system based on weighted channel features of a point cloud, comprising:

an extraction unit, a determination unit, a segmentation unit, and an estimation unit; wherein the extraction unit is configured to extract a target in a two-dimensional image by a pre-trained deep convolutional neural network to obtain a plurality of target objects;

the determination unit is configured to determine a point cloud frustum in a three-dimensional point cloud space corresponding to each target object of the plurality of target objects based on the each target object;

the segmentation unit is configured to segment a point cloud in the point cloud frustum based on a point cloud segmentation network to obtain a point cloud of interest; and the estimation unit is configured to estimate parameters of a 3D box in the point cloud of interest based on a network with the weighted channel features to obtain the parameters of the 3D box for three-dimensional object detection;

wherein, the step of determining the point cloud frustum in the three-dimensional point cloud space corresponding to the each target object based on the each target object specifically comprises:

converting a point $x_{vel}$ on a coordinate system of a Lidar sensor into a point $x_{cam}$ on a coordinate system of a camera by the following formula:

$$x_{cam}=T_{vel}^{cam}x_{vel};$$

wherein, $T_{vel}^{cam}$ represents a transformation matrix from the coordinate system of the Lidar sensor to the coordinate system of the camera;

projecting the point $x_{cam}$ on the coordinate system of the camera to a pixel point $x_{img}$ on the two-dimensional image by the following formula:

$$x_{img}=Px_{cam};$$

wherein, P represents a projection matrix from the coordinate system of the camera to a coordinate system of the two-dimensional image; and determining a plurality of point clouds projected onto the each target object according to the each target object, wherein the plurality of point clouds projected onto the each target object form the point cloud frustum.

10. The three-dimensional object detection system according to claim 9, wherein, the plurality of target objects are obtained by the following formula:

$$x, y, w, h = \text{Net}(I);$$

wherein, I represents the two-dimensional image, and Net represents the pre-trained deep convolutional neural network; and coordinates (x, y) of a center point, a length h and a width w of a 2D box represent a position of the each target object.

11. The three-dimensional object detection system according to claim 9, wherein, the step of segmenting the point cloud in the point cloud frustum based on the point cloud segmentation network to obtain the point cloud of interest specifically comprises:

calculating a probability that the point cloud in the point cloud frustum belongs to a point cloud of interest based on the point cloud segmentation network by the following formula:

$$p_i = f(x_i, \theta);$$

wherein, $x_i$ represents an $i^{th}$ point cloud in the point cloud frustum, $\theta$ represents a network training parameter, $p_i$ represents a probability that the $i^{th}$ point cloud $x_i$ belongs to the point cloud of interest, and f represents the point cloud segmentation network; and determining and obtaining the point cloud of interest according to the probability that each point cloud in the point cloud frustum belongs to the point cloud of interest and a predetermined probability threshold.

12. The three-dimensional object detection system according to claim 11, wherein, the step of determining and obtaining the point cloud of interest according to the probability that the each point cloud in the point cloud frustum belongs to the point cloud of interest and the predetermined probability threshold, specifically comprises:

determining that the point cloud is the point cloud of interest if the probability that the point cloud belongs to the point cloud of interest is greater than 0.5; determining that the point cloud is not the point cloud of interest if the probability that the point cloud belongs to the point cloud of interest is less than or equal to 0.5:

$$Mask_i = \begin{cases} 1, & p_i > 0.5 \\ 0, & p_i \leq 0.5 \end{cases};$$

wherein, $Mask_i$ represents a mask of the $i^{th}$ point cloud and takes a value of 1 or 0, and $p_i$ represents the probability that the $i^{th}$ point cloud $x_i$ belongs to the point cloud of interest point cloud of interest.

13. The three-dimensional object detection system according to claim 11, wherein, a segmentation loss is generated in the process of segmenting the point cloud in the point cloud frustum;

a cross-entropy loss function:

$$\text{Entropy\_Loss}(y, y^*) = \sum_{i=1}^{N} y_i \log y_i^* + (1 - y_i)\log(1 - y_i^*);$$

wherein, y, y* represent a real category and a predicted result, respectively; and N represents a total number of the point cloud in the point cloud frustum; and the segmentation loss:

$$L_{seg} = \text{Entropy\_Loss}(y, y^*)$$

14. The three-dimensional object detection system according to claim 13, wherein, the parameters of the 3 D box comprise a center, a size, an angle and a corner;

the step of estimating the parameters of the 3 D box in the point cloud of interest based on the network with the weighted channel features specifically comprises:

calculating a center loss, a size classification loss, a residual size regression loss, an angle classification loss, a residual angle regression loss and a corner loss of the 3 D box based on the network with the weighted channel features;

calculating a total loss function according to the segmentation loss and the center loss, the size classification loss, the residual size regression loss, the angle classification loss, the residual angle regression loss and the corner loss of the 3 D box; and estimating the parameters of the 3 D box in the point cloud of interest according to the total loss function to obtain the parameters of the 3 D box.

15. The three-dimensional object detection system according to claim 14, wherein, a Hingle loss function is calculated as follows:

$$Hingle_\delta(x) = \begin{cases} 0.5x^2, & |x| \leq \delta \\ \delta(|x| - 0.5\delta), & |x| > \delta \end{cases};$$

(1) the center loss is calculated as follows:

$$L_{center} = Hingle_{\delta=2.0}(x);$$

(2) the size classification loss of the 3 D box is calculated as follows:

$$L_{size-reg} = \text{Entropy\_Loss}(y, y^*);$$

(3) the residual size regression loss of the 3 D box is calculated as follows:

$$L_{size-reg} = Hingle_{\delta=1.0}(x);$$

(4) the angle classification loss of the 3 D box is calculated as follows:

$$L_{angle-cls} = \text{Entropy\_Loss}(y, y^*);$$

(5) the residual angle regression loss of the 3 D box is calculated as follows:

$$L_{angle-reg} = \sum_{m}^{S} \sum_{n}^{H} Mask_{mn}[2 - 2\cos(\theta_{mn} - \theta_{mn}^*)];$$

wherein, S represents a number of size templates of the 3 D box; m=1, 2, . . . S; H represents a number of direction angle templates of the 3 D box; n=1, 2, . . . , H; $Mask_{mn}$ represents a mask of an $m^{th}$ size template of the size templates of the 3 D box and a mask of an $n^{th}$ direction angle template of the direction angle templates of the 3 D box; $\theta_{mn}$ represents a training parameter of a network in the $m^{th}$ size template of the 3 D box and the $n^{th}$ direction angle template of the 3 D box; and $\theta^*_{mn}$, represents a predicted parameter of the network in the $m^{th}$ size template of the 3 D box and the $n^{th}$ direction angle template of the 3 D box;

(6) the corner loss of eight corners of the 3 D box is calculated as follows:

$$L_{corner} = \sum_{i=1}^{S}\sum_{j=1}^{H}\delta_{ij}\min\left\{\sum_{m=1}^{8}\|P_k^{ij} - P_k^+\|, \sum_{m=1}^{8}\|P_k^{ij} - P_k^-\|\right\};$$

wherein, S represents the number of the size templates of the 3 D box, H represents the number of the direction angle templates of the 3 D box, $P_k^{ij}$ represents a real coordinate of a $j^{th}$ direction angle template of an $i^{th}$ size template in a $k^{th}$ corner, $P_k^{ij}$ represents a predicted coordinate of the $k^{th}$ corner, and $P_k^-$ represents a coordinate of the $k^{th}$ corner after the 3 D box is rotated by 180 degrees around a vertical direction; $\delta_{ij}$ represents a real label of the $j^{th}$ direction template of the ith size template.

16. The three-dimensional object detection system according to claim 15, wherein, the total loss function L is calculated according to the following formula:

$$L = L_{seg} + \lambda(L_{center} + L_{size-reg} + L_{size-cls}L_{angle-reg} + L_{angle-cls}) + \gamma L_{corner};$$

wherein, $\lambda$ represents a weight of the center loss, the residual size regression loss, the size classification loss, the residual angle regression loss and the angle classification loss of the 3 D box, and y represents a weight of the corner loss.

* * * * *